United States Patent [19]
Youn

[11] Patent Number: 5,997,323
[45] Date of Patent: Dec. 7, 1999

[54] DEVICE FOR CONNECTING A PORTABLE COMPUTER TO A DOCKING STATION

[75] Inventor: Jae-Sam Youn, Kyunggi-do, Rep. of Korea

[73] Assignee: SamSung Electronic Co., Ltd., Kyungki-do, Rep. of Korea

[21] Appl. No.: 09/059,393

[22] Filed: Apr. 14, 1998

[30] Foreign Application Priority Data

Apr. 15, 1997 [KR] Rep. of Korea ............. 97-13725

[51] Int. Cl.⁶ ........................................ H01R 13/62
[52] U.S. Cl. ................... 439/159; 439/157; 439/953; 439/352
[58] Field of Search ..................... 439/159, 152, 439/352, 160, 157, 953

[56] References Cited

U.S. PATENT DOCUMENTS

| | | |
|---|---|---|
| 4,893,263 | 1/1990 | Myers . |
| 5,030,128 | 7/1991 | Herron et al. . |
| 5,283,714 | 2/1994 | Tsai ........................ 439/160 |
| 5,305,180 | 4/1994 | Mitchell et al. . |
| 5,310,358 | 5/1994 | Johnson et al. . |
| 5,323,291 | 6/1994 | Boyle et al. . |
| 5,477,415 | 12/1995 | Mitcham et al. . |
| 5,535,093 | 7/1996 | Noguchi et al. . |
| 5,580,182 | 12/1996 | Lin . |
| 5,619,398 | 4/1997 | Harrison et al. . |
| 5,694,292 | 12/1997 | Paulsel et al. . |

*Primary Examiner*—Neil Abrams
*Assistant Examiner*—Javaid Nasri
*Attorney, Agent, or Firm*—Robert E. Bushnell, Esq.

[57] ABSTRACT

A device is provided that is substantially enclosed inside the chassis of a docking station to connect a portable computer to a docking station. A beam is rotatably mounted at one end on a boss located on the inner surface of the top side of the chassis. A second end of the beam projects through a groove in the side of the chassis to allow a user to easily manipulate the beam. A spring biases the second end of the beam towards the rear of the chassis. A shaft is attached to the beam and extends downward from the beam to engage a plate. The plate has at least two slots that are substantially perpendicular to the front of the chassis. Fasteners are inserted through the slots and secured to bosses to allow the plate to slide forward and backward. Two prongs extend from the plate to eccentrically engage two latching members that are pivotally mounted on the inside of the chassis of the docking station. The latching members have torsion springs biasing them into an orientation that secures the portable computer to the chassis of the docking station. Thus, when a user slides the beam towards the front of the chassis, the plate moves forward and rotates the latching members using the two prongs to release the portable computer from the docking station.

18 Claims, 5 Drawing Sheets

DEVICE FOR CONNECTING A PORTABLE COMPUTER TO A DOCKING STATION

CLAIM OF PRIORITY

This application makes reference to, incorporates the same herein, and claims all rights accruing thereto under 35 U.S.C. §119 through my patent application entitled *Device for Portable Computer Docking stations and Docking station With the Same* earlier filed in the Korean Industrial Property Office on the Apr. 15, 1997 and there duly assigned Ser. No. 1997/13725.

BACKGROUND OF THE INVENTION

1. Field of the Invention

The present invention relates to a device used with computers and, more specifically, to a device for connecting a portable computer to a docking station.

2. Background Art

The ease of traveling with portable computers, e.g. portable computers, has been one of the factors in their increasing popularity. A portable computer is often constructed with a liquid crystal display hingedly attached to the main body of the computer. The display panel also forms a cover for the keyboard, that is built onto the main body. Various ports are located along the rear side of the main body for attaching various input or output devices. However, the amount of time necessary to connect and disconnect a portable computer from peripheral devices is often inconvenient when a user is in a rush. To simplify the connection of portable computers to peripheral devices, a docking station is used to allow the portable computer to quickly connect and disconnect to a host of peripheral devices. The connection between the portable computer and the docking station is important for the effective use of the portable computer. Different techniques for connecting a portable computer to a docking station are shown, for example, in U.S. Pat. No. 5,580,182 to Lin entitled *Computer Peripheral Engagement/Disengagement Mechanism,* U.S. Pat. No. 4,893,263 to Myers entitled *Support Apparatus for Portable Computer Expansion Unit,* U.S. Pat. No. 5,619,398 to Harrison entitled *Manual Docking Apparatus Having Latch and Drive Mechanism for a Portable Computer,* U.S. Pat. No. 5,694, 292 to Paulsel entitled *Portable Computer Docking Station With Removable Support Shelf Apparatus,* U.S. Pat. No. 5,535,093 to Noguchi entitled *Portable Computer Docking Device Having a First Rotatable Connector and a Second Connector,* U.S. Pat. No. 5,323,291 to Boyle entitled *Portable Computer and Docking Station Having an Electromechanical Docking/Undocking Mechanism and a Plurality of Cooperatively Interacting Failsafe Mechanisms,* U.S. Pat. No. 5,310,358 to Johnson entitled *Computer Docking System,* U.S. Pat. No. 5,030,128 to Herron entitled *Docking Module,* U.S. Pat. No. 5,305,180 to Mitchell entitled *Disk Drive Ejector Mechanism with Latch and Ejector and Standby Switch,* and U.S. Pat. No. 5,477,415 to Mitcham entitled *Automatic Computer Docking Station Having a Motorized Tray, Cammed Side Connectors, Motorized Side Connectors, and Locking and Unlocking Pins.*

I believe it may be possible to improve on the docking station connection devices of the contemporary art by providing a connecting device that is not motorized, that is simple to construct, that is economical to produce, that secures a portable computer to a docking station until a release is activated, and that prevents accidental separation of the computer from the docking station.

SUMMARY OF THE INVENTION

Accordingly, it is an object of the present invention to provide an improved device for connecting a portable computer to a docking station.

It is another object to provide a device for connecting a portable computer to a docking station that is non-motorized, thus reducing cost and the simplicity of repair.

It is still another object to provide a device for connecting a portable computer to a docking station that is simple to construct.

It is yet another object to provide a device for connecting a portable computer to a docking station that has few component parts.

It is still yet another object to provide a device for connecting a portable computer to a docking station that is economical to manufacture.

It is a further object to provide a device for connecting a portable computer to a docking station that secures a portable computer to a docking station until a release is activated.

It is a further object still to provide a device for connecting a portable computer to a docking station that prevents the accidental separation of the portable computer from the docking station.

To achieve these and other objects, a connecting device is provided that is enclosed in the chassis of the docking station and connects a portable computer to a docking station. A beam is rotatably mounted at one end on a boss located on the inner surface of the top side of the chassis. A second end of the beam projects through a groove in the side of the chassis to allow a user to easily manipulate the beam. A spring biases the second end of the beam towards the rear of the chassis. A shaft is attached to the beam and extends downward from the beam to engage a plate. The plate has at least two slots that are substantially perpendicular to the front of the chassis. Fasteners are inserted through the slots and secured to bosses to allow the plate to slide forward and back. Two prongs extend from the plate eccentrically to engage two latching members that are mounted pivotally on the inside of the chassis of the docking station. The latching members have torsion springs biasing them into an orientation that secures the portable computer to the chassis of the docking station. Thus, when a user slides the beam towards the front of the chassis, the plate moves forward and rotates the latching members using the two prongs to release the portable computer from the docking station.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
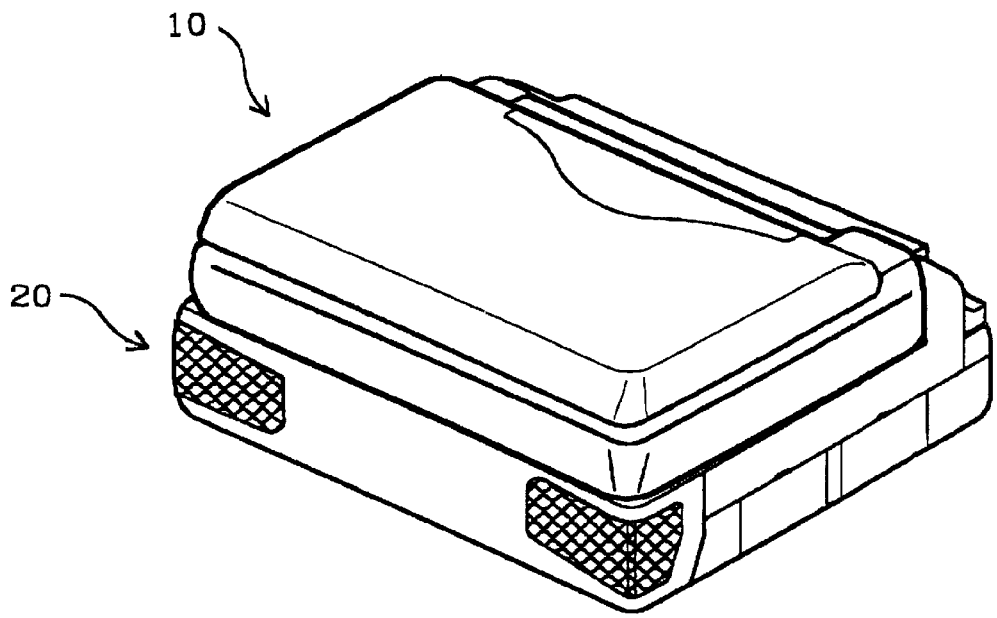
FIG. 1 is a perspective view of a portable computer engaged with a docking station.

Turning now to the drawings, FIG. 1 illustrates a portable computer used with a docking station. Docking station 20 allows portable computer 10 to interface quickly with numerous peripheral devices without having to attach each device to the portable computer individually. Docking station 20 uses a connector to secure the portable computer to the docking station.

Figure 5:
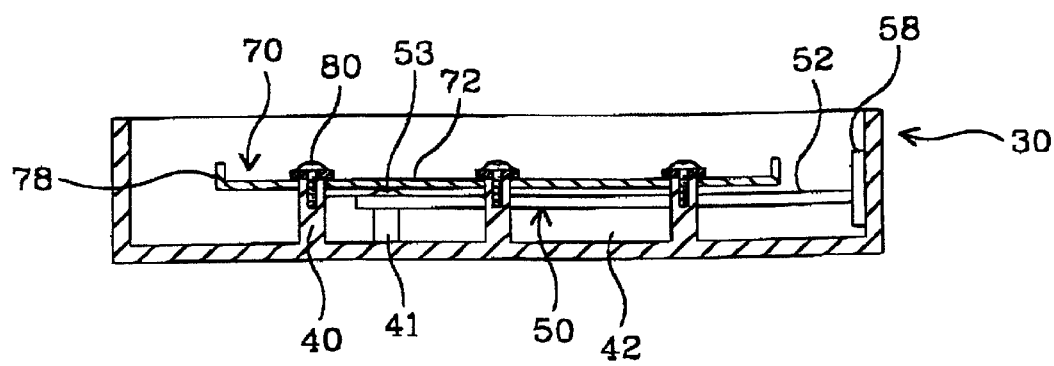
FIG. 5 is a cross-sectional view of the connecting device of FIG. 4 as taken along the line A–A'.
Figure 2:
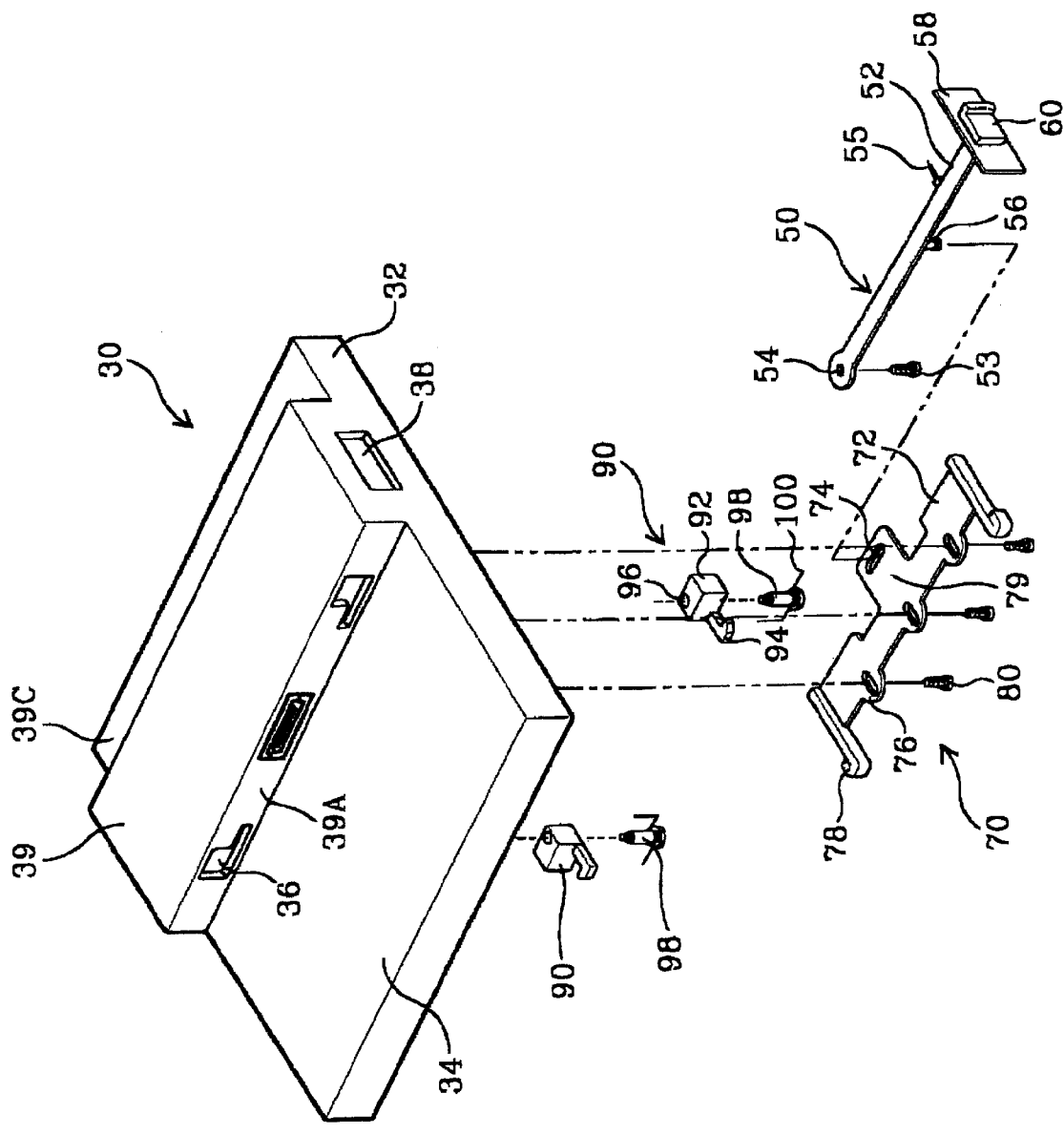
FIG. 2 is an exploded perspective view of a device for connecting a portable computer to a docking station as constructed according to the principles of the present invention.
Figure 3:
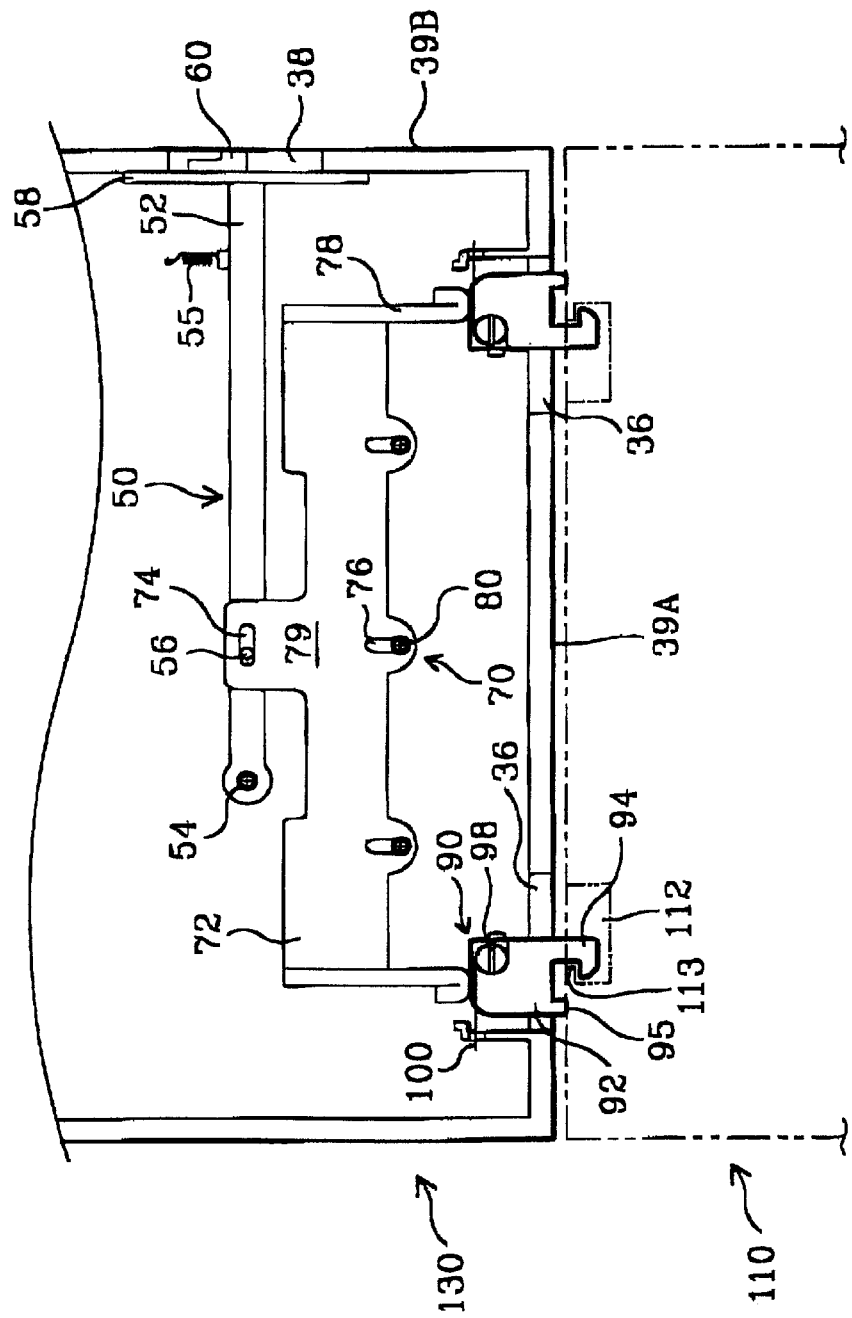
FIG. 3 is a bottom view of the connecting device of FIG. 2 illustrating the salient parts of the connecting device assembled into a single body.
Figure 4:
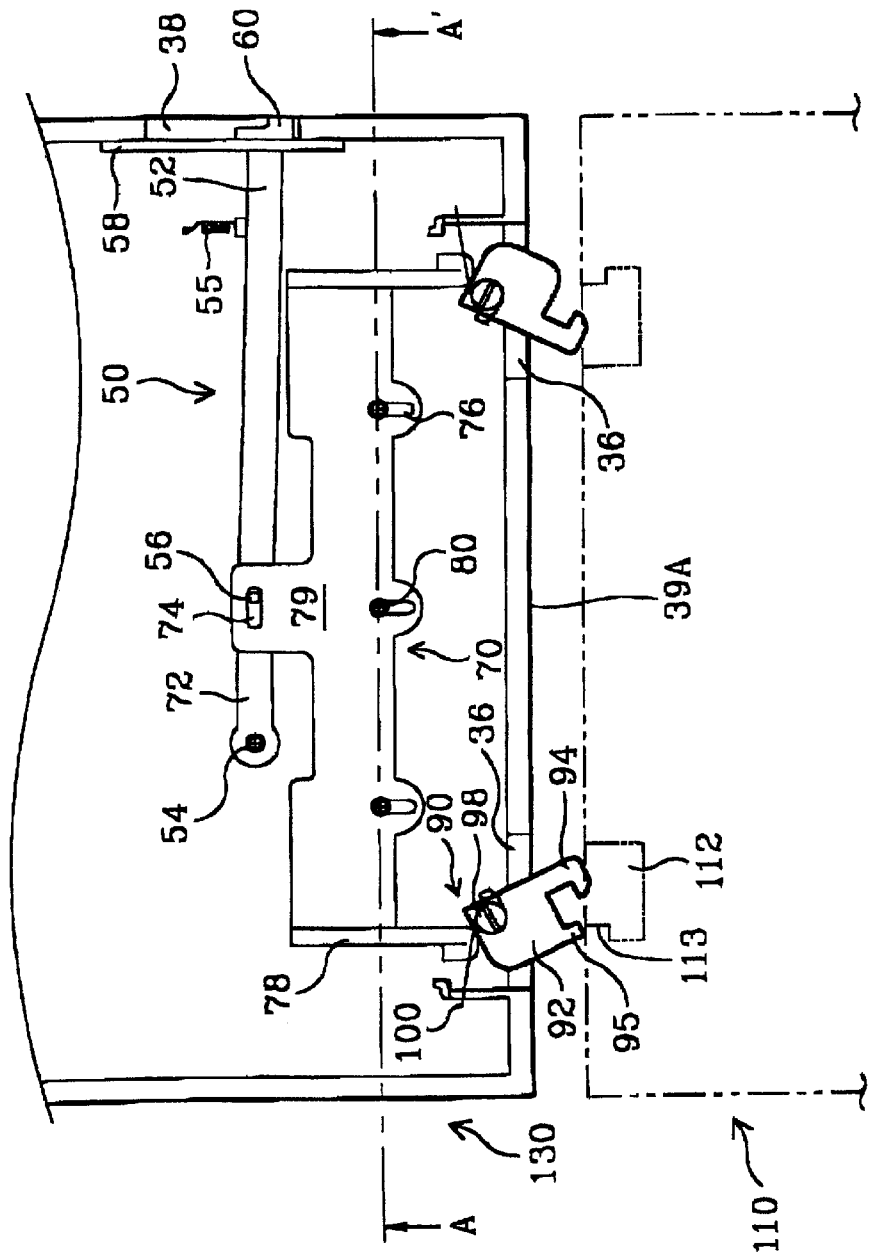
FIG. 4 is a bottom view of the connecting device of FIG. 2 illustrating the connecting device in a portable computer releasing configuration.

FIGS. 2 through 6 illustrate a connecting device for attaching portable computers to docking stations as constructed in accordance with the present invention. FIG. 2 shows a connecting device for connecting a portable computer to a docking station. FIG. 3 is a bottom view of the connecting device of FIG. 2 with the parts of the connecting device being assembled into a single body. FIG. 4 is a bottom view showing the operation of the connecting device of FIG. 2. FIG. 5 is a cross-sectional view of the connecting device of FIG. 4 as taken along the line A–A'.

As shown in FIG. 2, the connecting device of this invention may be constructed using beam 50, plate 70, and latching members 90 that are movable mounted in chassis 30 of the docking station. Chassis 30 may be constructed with an open bottom or a bottom that is fastenably attached after the installation of the connecting device. Top side 39C of chassis 30 may be constructed with rectangular body 39 that is formed across the width of the chassis. Chassis 30 has tray 34 extending from the front side of rectangular body 39. Tray 34 supports the portable computer while it is engaged with the docking station. Pair of apertures 36 are formed in front side 39A of rectangular body 39 of chassis 30. First groove 38 is formed in one of two lateral sides 32 of rectangular body 39. Beam 50 and plate 70 are installed in chassis 30 as follows. Beam 50 is pivotally mounted on the inside of top side 39C of rectangular body 39 of chassis 30 via groove 38. Beam 50 is mounted by beam fastener 53 that fastens onto a boss 41 (see FIG. 5) attached to the inside of top side 39C of chassis 30. It should be understood that the rotating shaft of the beam 50 may be constructed by any means that allows beam 50 to rotate about one end. The means used is not critical to the present invention. To receive beam fastener 53, one end of beam 50 is perforated to form a shaft hole 54. Beam 50 is positioned with second end 52 slightly projected from first groove 38 in a lateral side 32 of chassis 30. This allows a user to actuate beam 50 by sliding thumb grip 60. That is, beam 50 can be manually actuated through an angle depending on the length of beam 50 and the length of first groove 38 by a user manipulating the portion of beam 50 that projects outside of chassis 30. Thumb grip 60 is linearly movable in first groove 38 by a user to rotate beam 50 around shaft 53. Beam 50 is biased by elastic member 55. The elastic member can be any one of a spring, a hydraulic, or an elastic band. Elastic member 55 biases beam 50 towards the rear side of chassis 30.

Plate 58 is mounted inside chassis 30 after beam 50. Plate 58 covers first groove 38 to hide the interior of chassis 30 from outside viewing. Located on the bottom surface of beam 50 along an approximately central portion is shaft 56 that connects beam 50 to plate 70. Thus, allowing both beam 50 and plate 70 to move in tandem with each other.

Plate 70 is positioned slightly spaced from beam 50 on a side opposite top side 39A of chassis 30. Plate 70 has slot 74 located near rear portion 79. Slot 74 is oriented perpendicularly to front side 39A of rectangular body 39. Plate 70 can move in a reciprocating and rectilinear fashion in a direction perpendicular to front side 39A of chassis 30 as shown in FIG. 4. As beam 50 is moved about one end shaft 56 pushes plate 70 towards front side 39A of rectangular body 39. Beam 50 and plate 70 move cooperatively because of the interaction between shaft 56 and slot 74 of the plate. Plate 70 consists of flat body 72 that has slot 74 and plurality of slots 76 at the front portion of plate 70. Slots 76 are preferably spaced out at regular intervals and individually extend in a direction perpendicular to front side 39A of chassis 30. Plate 70 is movably mounted to the inside of top side 39C of rectangular body 39 by guide fasteners 80. Fasteners 80 pass through the slots 76 of plate 70 prior to being fastened to bosses 40 of the chassis 30, as shown in FIG. 5. At least one, or preferably two, protruding poles 78 are provided on flat body 72 of plate 70. As shown in FIG. 4, poles 78 transmit a linear force from plate 70 to latching member 90 when plate 70 moves towards front side 39A of chassis 30 in cooperation with the motion of beam 50.

Latching members 90 are arranged in chassis 30 at positions that correspond to each of protruding poles 78 of plate 70, thus being rotatable by plate 70. When protruding poles 78 contact latching members 90, an eccentrically loaded force causes the latching members to rotate out of the equilibrium position in which they are held by torsional springs. In the preferred embodiment of this invention, two latching members 90 are arranged in chassis 30. The two latching members are also partially projected through apertures 36 located in the front side of the rectangular body of chassis 30. Latching members 90 may be constructed with body 92, latch 94, protrusion 95, rotating shaft 98, and torsion spring 100. Body 92 of latching member 90 is rotatably mounted to chassis 30 via shaft 98. Latching member 90 can thus secure a portable computer with the docking station by inserting the latches into latch receptacles 112 in the portable computer 110, as shown in FIG. 3. Also, latching member 90 has protrusion 95 that separates the computer from the docking station. To remove the portable computer from the docking station, beam 50 is pushed towards front side 39A of chassis 30. Beam 50, which is in contact with plate 70 because shaft 56 is inserted into slot 74, causes plate 70 to also move towards front side 39A of chassis 30. This brings protruding poles 78 into contact with latching members 90. Prior to contact, the latching members 90 secure a portable computer to the docking station because biasing torsional springs 100 keep the latching members in a locked position, as shown in FIG. 3. Contact between protruding poles 78 and latching members 90 creates an eccentrically loaded force on latching members 90 that causes latching members 90 to rotate into an unlocked position, as shown in FIG. 4. Latch 94 is integrally formed with body 92 of latching member 90 and protrudes out through aperture 36 of the chassis over tray 34 that supports the portable computer. Rotating shaft 98 is used to rotatably mount the latching member body 92 to the inside of chassis 30. Torsion spring 100 is fitted over rotating shaft 98 to normally bias body 92 of the latching member in a locked position to secure a portable computer to the docking station.

When a portable computer is seated on tray 34, latch 94 of each latching member 90 is brought into engagement with latching receptacle 112 in the portable computer. This stably holds the portable computer on tray 34. When the thumb grip 60 of beam 50 is moved by a user, latch 94 is removed from the latch engagement device 113 in the latching receptacle 112, and the portable computer can be removed from tray 34.

Figure 6:
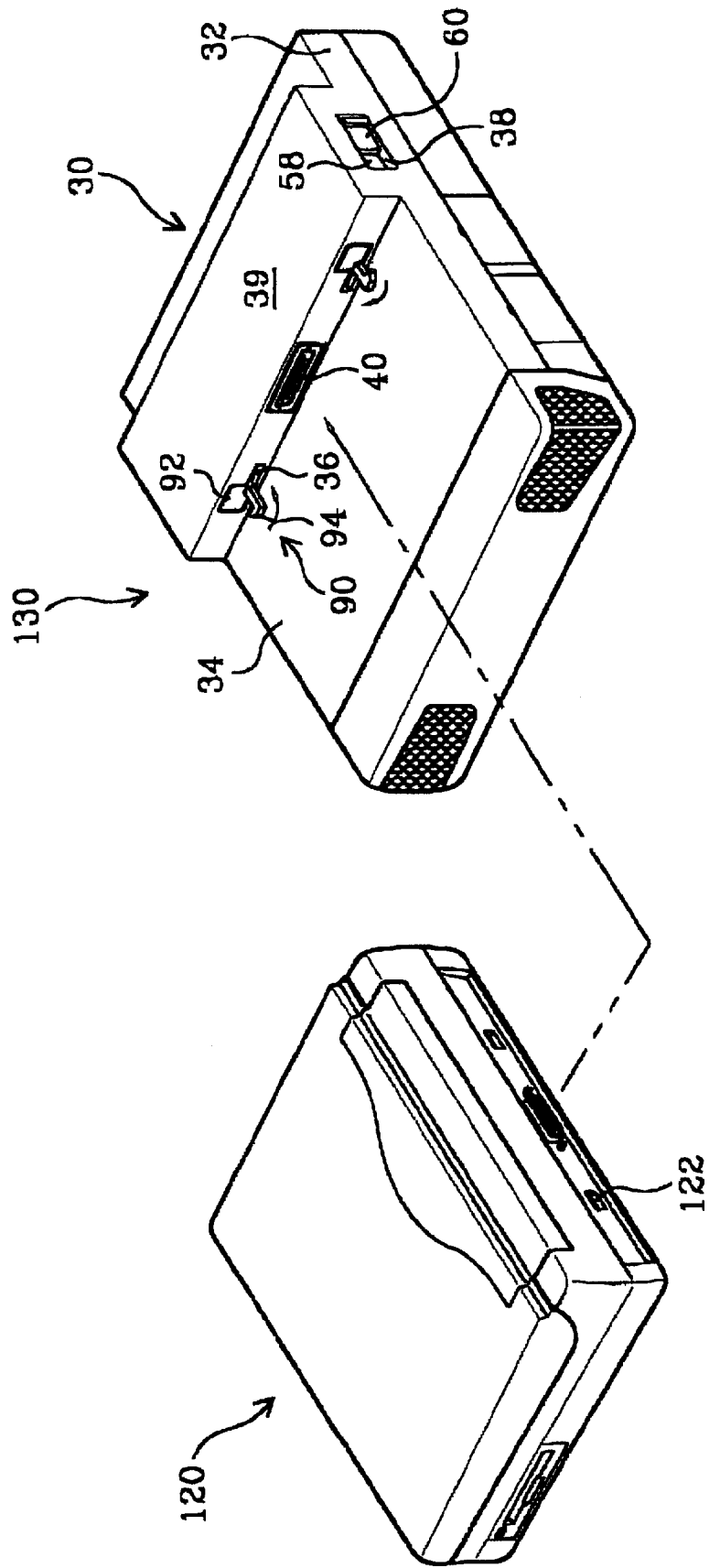
FIG. 6 illustrates a portable computer and docking station using the connecting device of FIG. 2.

In order to connect portable computer 110 to docking station 130, the computer must be seated on tray 34 of chassis 30 with latching receptacles 112 of computer 110 being aligned with the hooks 94 of latching members 90, as shown in FIGS. 3, 4, and 6. Then, computer 110 is pushed towards rectangular body 39 of chassis 30, and latches 94 are brought into engagement with latching recesses 112 of computer 110. This causes body 92 of latching members 90 to be rotated allowing latches 94 to be inserted into latching receptacles 112. Then, latching members 90 are returned to their locking position by the restoring force of torsion springs 100. This brings latches 94 into engagement with latching receptacle 112 of computer 110 and connects computer 110 to docking station 130. Thus, the connecting device almost completely prevents computer 110 from being unexpectedly removed from docking station 130.

In order to remove the computer 110 from docking station 130, thumb grip 60 of beam 50 is pushed towards front side 39A of chassis 30 by a user, as shown in FIG. 4. This causes beam 50 to rotate clockwise around shaft 53 while overcoming the biasing force of elastic member 55. A rotating force, caused by the rotating motion of beam 50, is transmitted to plate 70 via the connection created by shaft 56 of beam 50 being inserted through slot 74 of plate 70. Thus, plate 70 moves forward linearly under the regulation of guiding fasteners 80 that are inserted through slots oriented perpendicularly to the front side 39A of the chassis. Thus, protruding poles 78 of plate 70 cause latching members 90 to rotate about shafts 98, as shown in FIG. 4. Thus, latches 94 of latching members 90 are positioned in a way that allows latching recesses 112 of computer 110 to be freed from latches 94. Then, computer 110 may be removed from docking station 130. When the latching members 90 into an unlocked position they push the rear end of computer 110 as shown in FIG. 4, thus separating the rear end of computer 110 from front side 39A of rectangular body 39 of chassis 30. This, allows a user to easily remove computer 110 from docking station 130.

When the latching members 90 are not subject to any force generated by beam 50, latching members 90 are returned to their equilibrium locked positions by the force of torsion springs 100. When beam 50 and thumb grip 60 are free from any external force, beam 50 is returned to an equilibrium position by the restoring force generated by elastic member 55.

As described above, the present invention provides an connecting device for portable computer docking stations. The connecting device has a simple construction, thus being easily produced through economical manufacturing processes. The above connecting device is operated easily by users with one hand. The connecting device also holds stably a portable computer on a docking station and selectively ejects the computer from a tray of the chassis.

Although the preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A docking station having an ejecting device, comprising:
   a housing containing an electrically interfacing a portable computer with a plurality of peripheral devices;
   a first link rotatably and interiorly mounted on said housing along an inside end via a shaft and exposed to the outside of said housing along an outside end, said first link being rotatable through an angle of ratation around the shaft;
   a second link arranged in said housing at a position spaced aprt from said first link and connected to the first link with said second link reciprocatin in cooperation with a rotatin motion of said first link; and
   an ejecting unit interiorly mounted on said housing partially projecting from the housing, said ejecting unit being rotatable in cooperation with a reciprocating motion of said second link to selectively hold the portable computer on sadi housing and eject the portable computer from said housing.

2. The docking station of claim 1, further comprising a spring member normally biasing the first link in a direction to elastically return to an original position when an external force is removed from the first link.

3. The docking station of claim 1, wherein said second link comprises:
   a flat body having a thickness; and
   an actuatino protrusion provided on said flat bodky for applying a linear moving force of said second link to said ejecting unit when the second link reciprocates in cooperating with a rotating motion of the first link.

4. The docking station of claim 1, wherein said ejecting unit comprises:
   an ejector interiorly and rotatably mounted on said housing, to rotate through an angle of rotation in cooperation with a reciprocating motion of said second link and selectively eject the computer from the housing;
   a hook integrated with said ejector and projected from said housing, said hook being selectively brought into engagement with a recess of the computer;
   a rotating shaft rotatably mounting said ejector on the housing; and
   a spring coupled to said rotating shaft and normally biasing the ejector in a direction, thus allowing the ejector to be elastically returned to an original position when an external force is removed from the ejector.

5. A docking station for a portable computer, said docking station comprising:
   a chassis comprising:
      a body having a substantially rectangular shape, a bottom side, two lateral sides, and a front side;
      a first groove located in one of said two lateral sides; and
      two aperatures in said front side of said body;
   a beam enclosed by said chassis and pivotally connected at one end to said chassis, said beam comprising:
      a second end protruding through and slidably engaged with said first groove in said chassis; and
      a shaft extending towards said bottom side of said chassis;
   a plate enclosed by said chassis and slidably and fastenably connected to said chassis, said plate comprising:
      a plurality of slots oriented substantially perpendicularly to said front side of said chassis, said slots slidable along a plurality of fasteners each penetrating one of said slots and each fastened to said chassis;
      a second groove oriented substantially parallel to said front side of said chassis and slidably engaging said shaft of said beam, said shaft penetrating said second groove to connect said plate to said beam; and two protruding poles extending form said plate towards said front side of said chassis;

two latching members pivotally mounted in said chassis, each of said two latching members comprising:

a latch protruding through one of said two apertures in said chassis and being engageable with said portable computer; and a torsional spring biasing one of said two latcing members into an equilibrium position securing said portable computer to said chassis; and said second end of said beam being slidable towards said front side of said chassis to slide said plate and bring said two protruding poles into eccentric contact with said two latcing members and to rotate said two latcing members into a position releasing said portable computer form said docking station.

6. The docking station of claim 5, further comprising a boss located on said inner surface of a top side of said chassis for securing said beam in a pivotal manner.

7. The docking station of claim 6, further comprising a plurality of bosses located on an inner surface of said top side of said chassis for engaging said fasteners slidably securing said plate to said chassis.

8. The docking station of claime 5, further comprised of said beam haivng a plate attached at said second end slidably contacting one of said two lateral sides.

9. The docking station of claim 5, said chassis further comprising:

a port supported by said body for interfacing with said portable computer;

a tray attached to said body and extending from the front said support said portable computer while said portable computer is interfaced with said docking station; and a plurality of peripheral ports supported by said body for interfacing with a peripheral device.

10. The docking station of claim 5, said second end of said beam being biased by an elastic member towards a rear side of said chassis.

11. The docking station of claim 5, further comprising said two latching members each having a protrusion mounted near side latch on said latching members to push said portable computer away from said docking station when said two latching members are moved into said position releasing said portable computer.

12. A docking station having a device for mechanically securing a portable computer, comprising:

a chassis containing means for electrically interfacing said portable computer with a plurality of peripheral devices;

a beam enclosed by said chassis and pivotally connected at one end to said docking station, said beam comprising:

a second end protruding through and slidably engaged with a first groove in said docking station; and a shaft extending towards a base of said docking station;

a plate enclosed by said docking station and slidably and fastenably connected to said docking station, said plate comprising:

a plurality of slots oriented substantially perpendicularly to a front side of said docking station, said slots being slidable along a plurality of fasteners each of said fasteners penetrating one of said slots and each fastened to said docking station;

a second groove oriented substantially parallel to said front side of said docking station and slidably engaging said shaft of said beam, said shaft penetrating said second groove to connect said plate to said beam; and two protruding poles extending from said plate towards said front side of said docking station;

two latcing members pivotally mounted inside said docking station, each of said two latching members comprising:

a latch protruding through an aperature in said chassis and being engageable with said portable computer; and a torsional spring biasing one of said two latching members into an equilibrium position securing said portable computer to said docking station; and said second end of said beam being slidable towards said front side of said docking station to slide said plate and bring said two protruding poles into eccentric contact with said two latching members and to rotate said two latching members into a position releasing said portable computer from said docking station.

13. The docking station of claim 12, further comprising a boss located on an inner surface of a top side of said docking station for securing said beam in a pivotal manner.

14. The docking station of claim 13, further comprising a plurality of bosses located on said inner surface of said top side of said docking station for engaging said fasteners slidably securing said plate to said docking station.

15. The docking station of claim 14, further comprised of said beam having a plate attached at said second end slidably contacting one of said two lateral sides.

16. The docking station of claim 15, with said second end of said beam being biased by an elastic member towards a rear side of said docking station.

17. The docking station of claim 12, further comprising said two latcing members each having a protrusion mounted near said latch on said latching members to push said portable computer away from said docking station when said two latching members are moved into said position releasing portable comuputer.

18. A docking station comprising:

a housing containing an interface providing an operational connection for a portable computer with a peripheral device;

a first link pivotally and interiorly mounted within said housing with an end portion of said first link exposed by said housing to accommodate manual manipulation by a user forcing said first link to travel through an angle of rotation;

a second link mounted within said housing at a position spaced apart from and connected to said first link to exhibit rectilinear movement in cooperation with said travel of said first link, said second link moving in a direction towards the portable computer operationally coupled to said interface; and an ejecting unit interiorly mounted in said housing, partially projecting from said housing, and pivotally rotating in cooperation with said rectilinear movement of said second link to alternately retentively engage and release the portable computer operationally coupled to said interface.

* * * * *